United States Patent [19]

Berndt et al.

[11] 4,299,868

[45] Nov. 10, 1981

[54] COATING COMPOSITIONS

[75] Inventors: Gerhard Berndt, Monheim; Eberhard König, Kronberg; Josef Pedain, Cologne; Wilhelm Thoma; Walter Schröer, both of Leverkusen, all of Fed. Rep. of Germany

[73] Assignee: Bayer Aktiengesellschaft, Leverkusen, Fed. Rep. of Germany

[21] Appl. No.: 108,105

[22] Filed: Dec. 28, 1979

Related U.S. Application Data

[63] Continuation of Ser. No. 22,392, Mar. 21, 1979, abandoned.

[30] Foreign Application Priority Data

Apr. 1, 1978 [DE] Fed. Rep. of Germany ....... 2814079

[51] Int. Cl.$^3$ .............................................. B05D 3/02
[52] U.S. Cl. ...................... 427/389.9; 260/29.2 TN; 260/29.6 NR; 260/29.6 N; 260/29.7 NR; 260/29.7 N; 260/31.2 N; 260/32.6 N; 260/32.8 N; 260/33.2 R; 260/33.4 R; 260/33.4 UR; 427/389; 427/396; 427/412; 427/428; 525/125; 525/131
[58] Field of Search ..................... 427/389.9, 428, 429, 427/412, 396; 260/29.2 TN, 29.7 UA, 29.6 NR, 29.7 NR, 29.6 N, 29.7 N, 33.2 R, 31.2 N, 32.8 N, 32.2 N, 33.4 UR, 33.4 R; 528/44, 45; 525/125, 131

[56] References Cited

U.S. PATENT DOCUMENTS 3,228,820 1/1966 Samson ................................ 156/307
3,755,261 8/1973 van Gulick ..................... 260/46.5 X
3,882,189 5/1975 Hudak ...................... 260/29.2 TN X
3,905,929 9/1975 Noll ............................. 260/29.2 TN
4,093,569 6/1978 Reischl et al. ............. 260/29.2 TN
4,119,602 10/1978 Isgur et al. ............. 260/29.2 TN X
4,143,091 3/1979 Chang et al. ................... 525/125 X

FOREIGN PATENT DOCUMENTS 1770068 1/1971 Fed. Rep. of Germany .
2431846 1/1976 Fed. Rep. of Germany .
2094058 2/1972 France .
1085455 10/1967 United Kingdom .
1414847 11/1975 United Kingdom .
1523148 8/1978 United Kingdom .

Primary Examiner—Ronald H. Smith
Assistant Examiner—Thurman K. Page
Attorney, Agent, or Firm—Gene Harsh; Lawrence S. Pope; Thomas W. Roy

[57] ABSTRACT

This invention relates to compositions which are crosslinkable by heating to form polyurethane plastics for coating substrates, preferably textile sheet-form materials, in particular by the reverse coating process. For ecological and economic reasons, the coating compositions are free from organic solvent or contain at most 10% by weight of organic solvent and consist essentially of linear and/or branched urethane prepolymers having blocked terminal NCO-groups, aqueous dispersions of urethane polymers, vinyl polymers and/or diene polymers and/or aqueous polymer solutions and aliphatic and/or cycloaliphatic and/or aromatic amines containing at least two primary and/or secondary amino groups as latent crosslinkers. The chain extending or crosslinking reaction takes place at an elevated temperature in a coating tunnel after the coating has been applied to a substrate.

10 Claims, No Drawings

COATING COMPOSITIONS

This is a continuation of application Ser. No. 22,392 filed Mar. 21, 1979, now abandoned.

BACKGROUND OF THE INVENTION

It has long been known that textile materials, such as woven fabrics, knitted fabrics or non-woven fabrics, can be coated with solutions of polyurethanes by the direct or reverse coating process for the purpose of producing artificial leather and similar products. The coating solutions may contain either urethane prepolymers, which are reacted with polyfunctional crosslinking agents in order to establish their final plastics properties and product fastness levels (so-called two-component polyurethanes), or high-polymer polyurethanes which already have all their plastic properties (so-called one-component polyurethanes).

The coatings thus obtained are used for the production of outer clothing, purses and handbags, shoe upper material, awnings, blinds, upholstered goods and many other articles.

It is known from German Offenlegungsschrift No. 2,431,846 that polyurethanes can be processed from solution in a mixture of water and a single organic solvent, for example dimethyl formamide, in order to enable the solvent to be recovered and recycled for ecological and economic reasons. It is also known (German Offenlegungsschrift Nos. 1,770,068 and 2,314,512) that coatings can be produced from ionic or non-ionic polyurethane dispersions which are thickened with water-soluble or water-swellable polymers to establish the viscosity required for spreading.

German Offenlegungsschrift No. 2,448,133 describes the coating of textiles with reactive polyurethane systems which are free from volatile solvents, such as dimethyl formamide, methylethyl ketone, toluene, etc., but instead contain, for example, PVC plasticizers of the phthalic acid ester type. The advantage of reactive systems such as these lies in the absence of conventional solvents. This advantage is, however, offset by the presence of PVC plasticizers which effloresce or exude from the coatings and make the coated articles sensitive to dry cleaning. In one particular process of this type (U.S. Pat. No. 3,755,261), complex salts of 4,4'-diaminodiphenyl methane are dispersed as latent crosslinkers in PVC plasticizers. The disadvantage of this process lies above all in the toxic properties of 4,4'-diaminodiphenyl methane. Another serious disadvantage of conventional solvent free PUR-reactive systems lies in the deep penetration of the coating composition into the textile substance, resulting in the formation of coated articles having a hard feel and an unattractive grain.

According to the prior art (U.S. Pat. No. 3,228,820), this disadvantage is partly obviated by the addition of thixotropic agents based on finely dispersed silica. Apart from the considerable amount of energy required for dispersion, however, it is also generally necessary to add organic solvents for adjusting the necessary working viscosity.

It has now surprisingly been found that the above-mentioned disadvantages of conventional coating processes can be obviated by using the coating compositions described hereinafter which are substantially free from solvent and consist of a mixture of a masked NCO-prepolymer, an aqueous polymer dispersion and a polyamide.

SUMMARY OF THE INVENTION

Accordingly, the present invention relates to coating compositions comprising (a) from about 50 to 95% by weight and preferably from about 60 to 85% by weight of an optionally branched prepolymer containing from 2 to 8, preferably from 2 to 4 and, with particular preference, 2 or 3 terminal, masked isocyanate groups and having an average molecular weight ($\overline{M}_n$) of from about 500 to 25,000, preferably from about 2,000 to 10,000 produced from a relatively high molecular weight polyhydroxyl compound and an excess of polyisocyanate, followed by masking of the free NCO-groups, (b) from about 2 to 20% by weight, preferably from about 4 to 10% by weight of an aliphatic and/or cycloaliphatic and/or aromatic amine containing at least two primary and/or secondary amino groups, (c) from about 3 to 50% by weight, preferably from about 10 to 30% by weight, of a stable aqueous polymer dispersion and/or aqueous polymer solution having a solids content of from about 20 to 70% by weight, preferably from about 30 to 50% by weight and, with particular preference, approximately 40% by weight, and (d) from about 0 to 10% by weight, preferably from about 0 to 6% by weight of an organic solvent.

The coating compositions according to the present invention are preferably solvent-free. The concentrations of the polymer dispersion or solution are generally selected in such a way that the coating composition contains from about 1 to 25% by weight, preferably from about 5 to 15% by weight, of the polymer and from about 2 to 30% by weight, preferably from about 10 to 25% by weight, of water.

The present invention also relates to a process for coating substrates in which a coating composition based on a polyurethane reactive system is applied to the substrate by the direct or reverse coating process and hardened while shaping or forming, characterized in that the compositions according to the invention are used for coating and are hardened by heating the coated substrate to a temperature of from about 120° to 190° C. and preferably to a temperature of from about 140° to 170° C.

DETAILED DESCRIPTION OF THE INVENTION

It may be regarded as surprising that the masked NCO-prepolymers, which are generally incompatible with pure water, can be mixed with aqueous polymer dispersions and/or aqueous polymer solutions up to a ratio by weight of about 1:1 to form stable emulsions which retain their spreadability and their uniform levelling over prolonged periods. In addition, the film-forming capacity of the pastes thus obtained is also distinctly improved.

It is particularly surprising that the coating pastes according to the present invention do not penetrate into textile substrates. As already mentioned, this penetration of the coating compositions into the textile in conventional processes leads to a hard feel, poor grain and low adhesion of the coated articles.

The urethane prepolymers containing terminal masked NCO-groups (component a) of the coating compositions according to the present invention are obtained from optionally branched compounds containing from 2 to 8, preferably from 2 to 4 and, with particular preference, 2 or 3 hydroxyl groups and having a molecular weight ($\overline{M}_n$) in the range of from about 400 to 10,000, preferably in the range of from about 1000 to 4000 (in particular polyester polyols and preferably polyether polyols), and an excess of aromatic and/or cycloaliphatic and/or aliphatic polyisocyanates and masking agents.

An NCO/OH-equivalent ratio of from about 1.3:1 to 2.5:1 is preferably maintained, an NCO/OH-equivalent ratio of from about 1.8:1 to 2.1:1 being particularly preferred, so that the urethane prepolymers contain from about 1 to 8% by weight, preferably from about 2 to 4% by weight, of NCO-groups in masked form.

The polyesters and/or polyethers used for producing the urethane prepolymers are made up of known units, such as for example dialcohols or trialcohols, di- and tri-carboxylic acids, hydroxy carboxylic acids, lactones, ethylene oxide 1,2-propylene oxide, 1,2-butylene oxide or tetrahydrofuran or mixtures thereof.

It is preferred to use polyethers and polyesters having a melting point below 40° C., polyethers and polyesters having a melting point below 20° C. being particularly preferred.

Polyhydroxyl compounds suitable for use in the production of the coating compositions according to the present invention are described in detail in German Offenlegungsschrift Nos. 2,431,846 and 2,482,840 (U.S. Pat. No. 3,984,607) and in German Auslegeschrift No. 2,457,387 (U.S. Pat. No. 4,035,213). Polyisocyanates suitable for use in the production of the urethane prepolymers are also described in detail in these publications.

Suitable masking agents for the NCO-prepolymers are any of the compounds known in polyurethane chemistry for masking NCO-groups which, on heating above a temperature of about 120° C., are split off again with liberation of the isocyanate groups. Examples of these masking agents are ketoximes of hydroxylamine and ketones, such as acetone, methylethyl ketone, diethyl ketone, methyl propyl ketone, methylisopropyl ketone, methylisobutyl ketone, cyclohexanone, acetophenone and benzophenone.

Other suitable masking agents are alkyl esters of acetoacetic acid and malonic acid, for example acetoacetic acid ethyl ester and malonic acid diethyl ester, lactams such as caprolactam and phenols, such as nonyl phenol.

Prepolymers of polypropylene glycol ethers or propoxylated bisphenol A and tolylene diisocyanate and/or diphenyl methane diisocyanate which are masked with methylethyl ketoxime (butanone oxime) are preferably used in accordance with the present invention.

The coating pastes according to the present invention contain from about 3 to 50% by weight of aqueous polymer dispersions and/or aqueous polymer solutions. Suitable polymer dispersions are, for example, polyurethane dispersions, aqueous latices of homopolymers and copolymers of vinyl monomers and, optionally, dienes and also aqueous dispersions of nitrocellulose solutions, of the type known in the dressing of leather.

The polyurethane dispersions may contain anionic, cationic or non-ionic dispersion centers and, optionally, even external emulsifiers. Suitable PUR-dispersions are described, for example, by D. Dieterich et al in J. Oil Col. Chem. Assoc. 1970, 53, 363-379, in Die Angewandte Makromolekulare Chemie, 1972, 26, 85-106, in Angewandte Chemie 1970, 82, 53-63, and in German Offenlegungsschrift Nos. 2,550,860; 1,495,745 (U.S. Pat. No. 3,479,310 incorporated herein by reference); 1,495,770 (U.S. Pat. No. 3,535,274 incorporated herein by reference); 1,495,847 (Canadian Pat. No. 764,009); 1,770,068 (U.S. Pat. No. 3,756,992 incorporated herein by reference) and 2,314,512.

Preferred PUR-dispersions are PUR-dispersions of polyhydroxy polyesters, hexane and/or isophorone diisocyanate and ethylene diaminoethane sulphonate corresponding to the following formula:

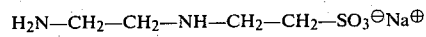

$$H_2N-CH_2-CH_2-NH-CH_2-CH_2-SO_3^{\ominus}Na^{\oplus}$$

The polymer latices suitable for use in accordance with the present invention may be synthesized for example from the following monomers: acrylic and methacrylic acid esters of methanol, ethanol or butanol; vinyl chloride, vinylidene chloride, vinylacetate, vinyl alcohol (by partial hydrolysis of polyvinylacetate), ethylene, propylene, acrylonitrile, styrene, butadiene, isoprene, chloroprene; also acrylamide, N-methylol acrylamide, methacrylamide, acrylic acid and methacrylic acid. Polymer latices of this type are described for example in U.S. Pat. No. 3,869,413 incorporated by reference herein and in German Offenlegungsschrift Nos. 2,550,832; 2,627,073 and 2,627,074.

According to the present invention, preferred polymer dispersions are polymer dispersions of acrylic acid butyl ester, styrene, acrylonitrile, acrylamide, acrylic acid and N-methylol acrylamide and, optionally, butadiene.

In addition to the polymer dispersions mentioned by way of example, the prepolymers containing masked terminal NCO-groups may also be blended with water-soluble or water-swellable polymers, for example with aqueous solutions of casein, caprolactam-modified casein, gelatin, cellulose ethers, polyacrylamide, polyvinyl alcohol, polyvinyl pyrrolidone, polyacrylic acid or alginates.

Examples of organic solvents inert to isocyanates which may optionally be present in the coating compositions according to the present invention are isopropanol, ethylene glycol monomethyl ether, ethylene glycol monoethyl ether and acetic acid esters thereof; methylethyl ketone, cyclohexanone, butylacetate and DMF.

For crosslinking, the coating pastes according to the present invention contain from about 2 to 20% by weight, preferably from about 4 to 10 by weight, based on the mixture as a whole, of aliphatic and/or cycloaliphatic and/or aromatic amines containing at least two primary and/or secondary amino groups. Amines such as these include ethylene diamine, diethylene triamine, 1,2-propylene diamine, 1,3-propylene diamine, 1,6-hexane diamine, N-methyl-bis-(3-aminopropyl)-amine, 1,3- and 1,4-cyclohexane diamine, isophorone diamine, 4,4'-diaminodicyclohexyl methane, the isomeric 4,4'-diamino-dimethyl dicyclohexyl methanes, 4,4'-diaminodiphenyl methane, diethyl tolylene diamine, but preferably amines liquid at room temperature which correspond to formulae II and III below and the tricyclic diamines according to German Offenlegungsschrift No. 2,638,731 (particularly the amine corresponding to formula I):

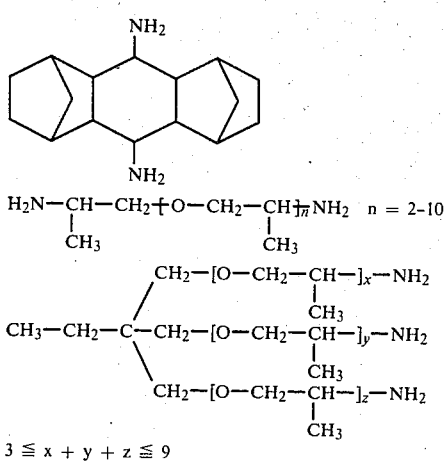

$$H_2N-\underset{CH_3}{\underset{|}{CH}}-CH_2\!+\!O-CH_2-\underset{CH_3}{\underset{|}{CH}}\overline{\!{}_{n}}\,NH_2 \quad n = 2\text{-}10 \qquad II$$

$$CH_3-CH_2-C\!\!\begin{array}{l}\diagup CH_2-[O-CH_2-\underset{CH_3}{\underset{|}{CH}}-]_x-NH_2\\ -CH_2-[O-CH_2-\underset{CH_3}{\underset{|}{CH}}-]_y-NH_2\\ \diagdown CH_2-[O-CH_2-\underset{CH_3}{\underset{|}{CH}}-]_z-NH_2\end{array} \qquad III$$

$$3 \leqq x + y + z \leqq 9$$

The equivalent ratio between $NH_2$- and masked NCO-groups in the coating compositions generally amounts to from about 1.1:1.0 to 0.7:1.0 preferably from about 1.0:1.0 to 0.8:1.0 and, with particular preference, about 0.9:1.0.

As already mentioned, the coating compositions according to the present invention are particularly suitable for coating sheet-form textiles, leather or skiver. The quantities in which they are applied may vary within wide limits and, in general, amount to from about 30 to 300 g/m², preferably from about 40 to 100 g/m². The coating compositions may be applied both by the direct coating process and also, preferably, by the reverse coating process. In this connection, it is of course also possible to apply conventional coating solutions or pastes as further layers to the substrate in addition to the coating compositions according to the present invention. Conventional formulations such as these are described in detail as surface or coupling coatings, for example, in German Offenlegungsschrift No. 2,457,387 (U.S. Pat. No. 4,035,213).

The coating pastes according to the present invention are preferably used as coupling coatings in the reverse coating of textiles, leather or skiver. The surface coat (preferably a paste according to the present invention or even a conventional formulation) is initially applied to a suitable intermediate support (for example a steel band, a separating paper, a silicone matrix and the like) in a thickness of from about 20 to 80 g/m² and dried in a drying tunnel. After this, the coupling coating is applied to the dried surface coat in a thickness of from about 30 to 100 g/m², the substrate applied, the coating heated at around 120° to 190° C., preferably at from 140° to 170° C. in another drying tunnel and the coated substrate withdrawn from the separation support.

As already mentioned, however, the coating pastes according to the present invention may also be directly applied to the textile substrate by the direct coating process.

In transfer or direct coating, the pastes can be applied in known manner by means of doctor kiss coaters, blanket coaters, reverse rollercoaters, etc. In addition, the modern techniques of screen printing and engraved roller printing may be advantageously used for highly concentrated coating pastes.

The coating pastes according to the present invention of urethane prepolymers containing masked terminal NCO-groups, aqueous polymer dispersions and polyamides as crosslinkers may contain various known additives, for example powdered pigments, formed pigments or other coloring agents, UV-stabilizers, antioxidants, feel-influencing agents such as silicones, cellulose esters, fillers such as chalk or heavy spar, surface-active silica gels, etc.

Unless otherwise indicated, the quantities quoted in the following Examples represent parts by weight and % by weight.

The following starting components are used for producing the masked NCO-prepolymers A-I used in the Examples:

Polyol 1: 1,2-propylene glycol-started polypropylene glycol ether (OH-number 56; average molecular weight 2000).

Polyol 2: Bisphenol-A-started polypropylene glycol ether (OH-number 200).

Polyol 3: Trimethylol propane-started polyether of propylene oxide and approximately 20% of ethylene oxide having an OH-number of 28 (average molecular weight 6000).

Polyol 4: Polyester of adipic acid and diethylene glycol (average molecular weight 2500).

Polyol 5: 1,2-propylene glycol-started polypropylene glycol ether (OH-number 112).

MDI: 4,4'-diphenyl methane diisocyanate.

TDI/80: Tolylene diisocyanate (mixture of 2,4- and 2,6-isomer in a ratio of 2:8).

IPDI: 3,3,5-trimethyl-5-isocyanatomethyl cyclohexyl isocyanate.

HDI: 1,6-hexane diisocyanate.

Production of blocked NCO-prepolymers (A) 2000 g of polyol 1, 275 g of polyol 2 and 22.5 g of 1,4-butane diol are added with stirring to 774 g of molten MDI. The mixture is reacted at 90° C. until the NCO-content has fallen to approximately 3.3%. Thereafter another 133 g of MDI are added, the mixture is cooled to around 50° C. and then reacted with 325 g of butanone oxime at from 80° to 100° C. until no more NCO-groups can be detected. The product is then diluted with 360 g of ethylene glycol monomethyl ether. The masked NCO-prepolymer A has a viscosity of approximately 50,000 cP/20° C. and a masked NCO-content of approximately 3.8%.

(B) 2000 g of polyol 1, 350 g of polyol 2 and 22.5 g of 1,4-butane diol are added with stirring to 643 g of HDI. The mixture is reacted at 110° C. until an NCO-content of 4.12% has been reached. Thereafter another 151 g of HDI are added, the mixture is cooled to around 70° C. and reacted with a mixture of 1100 g of isononyl phenol and 2 g of sodium phenolate at from 100° to 110° C. until no more NCO-groups can be detected. The masked NCO-prepolymer B has a viscosity of approximately 30,000 cP/20° C. and a masked NCO-content of approximately 4.3%.

(C) 2000 g of polyol 1, 275 g of polyol 2 and 22.5 g of 1,4-butane diol are added with stirring to 774 g of molten MDI. The mixture is reacted at 90° C. until the NCO-content has fallen to approximately 3.3%. Thereafter, another 194 g of MDI are added, the mixture is cooled to around 50° C. and reacted with 260 g of propanone oxime at from 80° to 100° C. until no more NCO-groups can be detected. The product is then diluted with 390 g of methyl glycol ether acetate. The masked NCO-prepolymer C has a viscosity of approximately 50,000 cP/20° C. and a masked NCO-content of approximately 4.25%.

(D) 1600 g of polyol 3 and 200 g of polyol 2 are dehydrated for 30 minutes at 120° C. in a water jet vacuum. After cooling to around 40° C., 200 g of MDI and 140 g of TDI/80 are added. The mixture is then left to react at 60° C. until an NCO-content of 2.9% has been reached (3 to 4 hours). After this NCO-content has been reached, 129 g of butanone oxime are added dropwise and the mixture is kept at 80° C. until all the NCO-groups have reacted off. A viscosity of from 60 to 65,000 mPas at 25° C. is adjusted by the addition of 22 g of methylethyl ketone (MEK) and 22 g of isopropanol.

Following the procedure described for prepolymer (D), the following masked NCO-prepolymers are also produced from the recipes indicated:

(E)

125.0 g of polyol 2
2000.1 g of polyol 3
187.5 g of MDI
130.5 g of TDI/80
144.0 g of butanone oxime
76.0 g of isopropanol
viscosity: approximately 40,000 mPas/25° C.
2.6% of masked NCO-groups.

(F)

2400 g of polyol 3
320 g of MDI
107 g of butanone oxime
87 g of ethylene glycol monomethyl ether
viscosity: 120,000 mPas/25° C.
1.8% of masked NCO-groups.

(G)

600.0 g of polyol 3
100.0 g of polyol 5
130.0 g of MDI
43.7 g of butanone oxime
viscosity: 40,000 mPas/25° C.
2.4% of masked NCO-groups.

(H)

1380 g of polyol 3
172.5 g of MDI
160 g of benzophenone oxime
50 g of dimethyl formamide
viscosity: 58,000 mPas/25° C.
2.0% of masked NCO-groups, (I)

2500.0 g of polyol 4
275.0 g of polyol 2
877.0 g of MDI
22.5 g of 1,4-butane diol
325.0 g of butanone oxime
360.0 g of ethylene glycol monoethyl ether
viscosity: approximately 80,000 mPas/25° C.
3.35% of masked NCO-groups.

EXAMPLE 1

The surface coat solution D 1 is a 25% solution of polycarbonate polyester urethane in dimethyl formamide (DMF) having a viscosity of 10,000 cP at 25° C. which is pigmented with 8% of a standard commercial-grade pigment paste of an iron oxide pigment, polyacrylate and cyclohexanone. The polycarbonate polyester urethane was produced by the melt condensation of 1000 g (0.5 mol) of hexane diol polycarbonate, 1125 g (0.5 mol) of a 1,4-butane diol polyadipate, 270 g of 1,4-butane diol (3.0 mols) and 1000 g of (4.0 mols) of 4,4'-diphenyl methane diisocyanate.

The pigmented surface coat solution D 1 is initially applied to a separation paper by doctor kiss coating in a coating machine comprising two spreading units (quantity applied 120 g/m²). The DMF evapoated during the passage through the first tunnel is delivered to a recovery unit. The coupling coat paste H 1 is similarly applied (in a quantity of 50 g/m²) in the second spreading unit. The textile web (a raised cotton fabric weighing approximately 160 g/m²) is also applied, and the crosslinking reaction in the coupling coat is induced in the second drying tunnel at a temperature on entry of 140° C. and a temperature on exit of 160° C.

The coupling coat paste H 1 consists of 1000 g of the masked NCO-prepolymer D, 300 g of a 40% aqueous dispersion of a copolymer of butylacrylate, styrene and N-methylol acrylamide and 68.5 g of 4,4'-diaminodimethyl dicyclohexyl methane in the form of an isomer mixture corresponding to the following general formula:

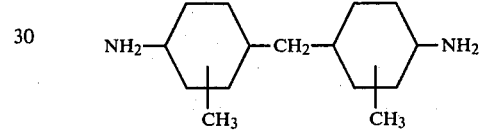

as crosslinker (NH₂/NCO-equivalent ratio=0.90).

The coatings produced using the coupling coat paste H 1 according to the present invention have high flexural strength, firm adhesion and soft feel. In contrast, coatings produced using a coupling coat paste V 1, consisting of 1000 g of masked NCO-prepolymer D and 68.5 g of 4,4'-diaminodimethyl dicyclohexyl methane, but without an added dispersion have, by comparison, distinctly weaker flexural strength, extremely poor adhesion and a stiff feel,

| Composition of the coating | Flexural Strength (Bally Flexometer) 20° C. −10° C. (in thousands) | Adhesion (N/ 2.5 cm) dry | Storage in ethyl- acetate (2 mins. at 25° C. | Dry cleaning in perchlor- ethylene | Feel |
|---|---|---|---|---|---|---|
| D1/H1 | 200 | 50 | 30 | intact | intact | soft |
| D1/V1 | 100 | 20 | 10 | separa- tion from the sub- strate | heavily damaged | stiff |

Results similar to those obtained using the coating of D 1 and H 1 are produced when the 4,4'-diaminodimethyl dicyclohexyl methane in the coupling coat paste is replaced by 71.0 g of the diamine corresponding to formula I above or by 68.5 g of a diamine corresponding to formula II having an amino group content of 13.5% or by 90.0 g of a diamine corresponding to formula III having an amino group content of 10.3% as crosslinking agent.

EXAMPLE 2

The surface coat solution D 2 is a 30% solution of a polyester urethane in DMF/MEK (1:1) having a viscosity of 20,000 cP/25° C. The polyurethane is synthesized from 1800 g (2.0 mols) of a 1,4-butane diol polyadipate, 174 g of TDI/80, 186 g of ethylene glycol (3.0 mols) and 1000 g of MDI.

After pigmenting, a surface coating having a weight per unit area of 30 g/m$^2$ is produced on a separation paper in the same way as described in Example 1. After the coupling coat paste H 2 has been applied, the textile web is applied in the same way as described in Example 1.

The coupling coat paste H 2 consists of 1000 g of the masked NCO-prepolymer E, 300 g of a 40% polyurethane dispersion, synthesized from hexane diol/adipic acid polyester having an OH-number of 130, 1,4-butane diol, ethylene diaminoethane sulphonate and 1,6-hexane diisocyanate and 66.0 g of a diamine corresponding to formula II (13.5% of amino groups) as crosslinker. This amine may be replaced with the same result by 66.0 g of 4,4'-diaminodimethyl dicyclohexyl methane or by 46.5 g of diaminodiethyl tolylene diamine (18.0% of amino groups) as crosslinker (NH$_2$/NCO=0.90).

Comparison coatings produced using a coupling coat paste V 2 consisting of the coupling coat paste H 2 minus the added dispersion, have considerably weaker flexural strength, weaker adhesion, inadequate resistance to dry cleaning and a harder feel than coatings of H 2 and D 2.

EXAMPLE 3

The surface coat paste D 3 is a 40% PUR-dispersion thickened with 2% of polyvinyl pyrrolidone and pigmented with 15% of titanium dioxide. For producing the dispersion, 1700 g (1.0 mol) of a mixed polyester of 1,6-hexane diol, neopentyl glycol and adipic acid are reacted with 303 g (1.8 mols) of 1,6-hexane diisocyanate to form an NCO-prepolymer. This NCO-prepolymer is chain-extended in aqueous dispersion with 152 g (0.8 mol) of the sodium salt of ethylene diaminoethane sulphonic acid as chain extender to form the polyester urethane plastic.

The coupling coat paste H 3 consists of 1000 g of the masked NCO-prepolymer E, 200 g of a 50% aqueous dispersion of a copolymer of butylacrylate, acrylonitrile, acrylamide and acrylic acid and 59.0 g of 4,4'-diaminodimethyl dicyclohexyl methane, corresponding to an NH$_2$/NCO-equivalent ratio of 0.80.

Textile coatings are produced with D 3 and H 3 in the same way as described in Example 1. Compared with these coatings according to the present invention, comparison coatings produced using a coupling coat paste V 3 consisting of the coupling coat paste H 3 minus the added dispersion have considerably weaker flexural strength, weaker adhesion, inadequate resistance to dry cleaning and a stiffer feel.

EXAMPLE 4

The procedure described in Example 1 is repeated using surface coat paste D 4 and coupling coat paste H4.

The surface coat paste D 4 is a 30% solution of an aliphatic one-component polyester urethane in toluene/isopropanol/ethylene glycol ethyl ether acetate (29:29:12) pigmented with 8% of a pigment paste of organic pigment, polyacrylate and cyclohexanone and having a viscosity of 22,000 cP/25° C. The polyurethane is produced by reacting an NCO-prepolymer of 1700 g (1.0 mol) of the polyester described in Example 3 and 490 g (2.2 mols) of IPDI with 205 g (1.2 mols) of 1-amino-3-aminomethyl-3,5,5-trimethyl cyclohexane (IPDA) in solution.

The coupling coat paste H 4 consists of 100 g of the blocked NCO-prepolymer F, 250 g of the same 40% acrylate dispersion as in coupling coat paste H 1 and 45.6 g of 4,4'-diaminodimethyl dicyclohexyl methane (NH$_2$/NCO-equivalent ratio=0.90) as crosslinker.

EXAMPLE 5

The procedure described in Example 1 is repeated using surface coat paste D 5 and coupling coat paste H 5.

The surface coat paste D 5 consists of 1000 g of the masked NCO-prepolymer A, 30 g of the 40% acrylate dispersion of coupling coat H 1 and 96.0 g of 4,4'-diaminodimethyl dicyclohexyl methane (NCO/NH$_2$=0.90) as crosslinker. Using a cylinder screen printing machine, the paste is processed to form a surface coat applied in a quantity of 50 g/m$^2$. The surface coat is crosslinked in a heating tunnel (temperature on entry 140° C., temperature on exit 160°–170° C.).

A mixture of 1000 g of the masked NCO-prepolymer E, 300 g of the same 40% acrylate dispersion as in coupling coat H 1 and 66.0 g of 4,4'-diaminodimethyl dicyclohexyl methane (NCO/NH$_2$=0.90) as crosslinker is applied as the coupling coat paste H 5. The textile is applied in the same way as described in Example 1 and the coupling coat is crosslinked at from 140° to 170° C.

EXAMPLE 6

The following mixture is used as first coat (60 g/m$^2$) for the direct coating of a polyester fabric weighing from 200 to 200 g/m$^2$:

1000 g of the masked NCO-prepolymer, C 200 g of the same 40% PUR-dispersion as in coupling coat H 2 and 104.0 g of 4,4'-diaminodimethyl dicyclohexyl methane (DDDM) as crosslinker. The first coat is crosslinked at from 170° to 180° C. A mixture of 1000 g of the masked NCO-prepolymer C, 100 g of the same 40% PUR-dispersion as in coupling coat H 2 and 104 g of DDDM as crosslinker is also used as the surface coat. The quantity applied is 90 g/m$^2$ and crosslinking occurs at from 170° to 180° C. The final coat is a mixture of 1000 g of the masked NCO-prepolymer C and 104 g of DDDM as crosslinker. The quantity applied is 50 g/m$^2$ and crosslinking occurs at from 170° to 180° C.

EXAMPLE 7

The procedure described in Example 1 is repeated using the surface coat paste of Example 2. A mixture of 1000 g of the masked NCO-prepolymer E, 300 g of a 15% ammoniacally digested casein solution in water and 66.0 g of DDDM (NCO/NH$_2$=0.90) as crosslinker is used as coupling coat paste H 8.

EXAMPLES 8 to 21

The procedure described in Example 1 is repeated using the surface coat solution D 2. In each case, the coupling coat paste contains 1000 g of the prepolymer indicated in the following Table, the indicated quantity of aqueous polymer dispersion and 4,4'-diaminodimethyl dicyclohexyl methane as crosslinker. The following dispersions are used:

(a) copolymer of butyl methacrylate, ethyl methacrylate, acrylamide and N-methylol acrylamide
(b) copolymer of butylacrylate, styrene, acrylic acid and methacrylic acid
(c) copolymer of butylacrylate and vinylacetate
(d) copolymer of butadiene, acrylonitrile and N-methylol acrylamide
(e) copolymer of ethylacrylate and N-methylol acrylamide
(f) non-ionic polyurethane dispersion, containing a polyethylene propylene oxide as emulsifier, synthesized from a benzene diol/neopentyl glycol polyadipate (molecular weight 1700), HDI, IPDI and hydrazine
(g) anionic polyurethane dispersions of hexane diol/neopentyl glycol polyadipate (molecular weight 1700), HDI and the sodium salt of ethylene diaminoethane sulphonate
(h) copolymer of butyl-acrylate, acrylonitrile, acrylamide and N-methylolacrylamide
(j) anionic polyurethane dispersion synthesized from a diethylene glycol polyadipate (OH-number 45), polypropylene glycol (OH-number 112), MDI and the sodium salt of ethylene diaminoethane sulphonate.

TABLE

Composition of the coupling coat pastes

| Example No. | Masked prepolymer | Dispersion quantity g | Dispersion conc. % | type | Cross-linker (g) | Equivalent ratio $NH_2$/NCO |
|---|---|---|---|---|---|---|
| 8 | E | 300 | 40 | a | 66.0 | 0.90 |
| 9 | E | 300 | 48 | b | 66.0 | 0.90 |
| 10 | E | 200 | 50 | c | 66.0 | 0.90 |
| 11 | E | 400 | 40 | d | 66.0 | 0.90 |
| 12 | E | 300 | 50 | e | 66.0 | 0.90 |
| 13 | F | 300 | 50 | e | 45.0 | 0.90 |
| 14 | G | 400 | 50 | e | 61.0 | 0.90 |
| 15 | H | 500 | 50 | e | 51.0 | 0.90 |
| 16 | I | 300 | 50 | e | 75.5 | 0.80 |
| 17 | B | 500 | 50 | e | 109.0 | 0.90 |
| 18 | E | 300 | 50 | f | 66.0 | 0.90 |
| 19 | E | 300 | 40 | g | 66.0 | 0.90 |
| 20 | E | 300 | 50 | h | 66.0 | 0.90 |
| 21 | E | 300 | 40 | j | 66.0 | 0.80 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is a stable emulsion comprising:
   (a) from about 50 to 95% by weight of an optionally branched prepolymer which is not dispersible in pure water containing from 2 to 8 terminal masked isocyanate groups and having an average molecular weight ($\overline{M}_n$) of from about 500 to 25,000 produced from a relatively high molecular weight polyhydroxyl compound and an excess of a polyisocyanate, followed by masking of the free NCO-groups,
   (b) from about 2 to 20% by weight of an aliphatic and/or cycloaliphatic and/or aromatic amine containing at least two primary and/or secondary amino groups,
   (c) from about 3 to 50% by weight of a stable aqueous polymer dispersion and/or aqueous polymer solution,
   (d) from about 0 to 10% by weight of an organic solvent and
   (e) from about 2 to 30% by weight of water, wherein the ratio of primary or secondary amino groups of component (b) to the masked isocyanate groups of component (a) is between about 1.1:1 to 0.7:1.

2. Coating compositions as claimed in claim 1 characterized in that component (a) is a prepolymer based on a polyether or polyester polyol having a molecular weight ($M_n$) of from about 1000 to 4000 which contains from 2 to 4 terminal isocyanate groups masked by a ketoxime, and acetoacetic acid alkyl ester or a malonic acid dialkyl ester.

3. Coating compositions as claimed in claim 1 or 2 characterized in that component (a) contains from about 1 to 8% by weight of masked NCO-groups.

4. Coating compositions as claimed in claim 1 or 2 characterized in that component (b) is an isomer mixture corresponding to the following formula:

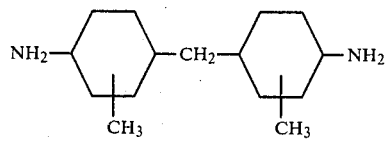

5. Coating compositions as claimed in claim 1 or 2 characterized in that component (b) is a polyamide corresponding to the following formulae:

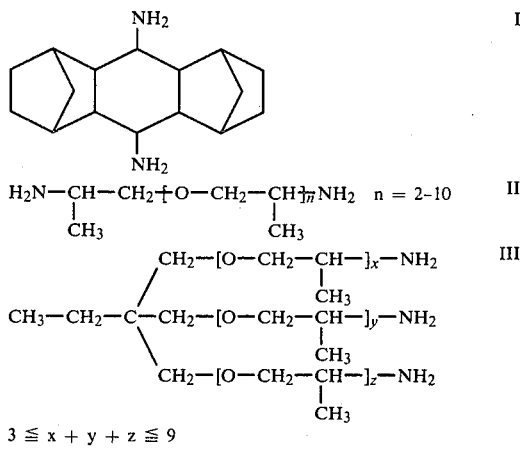

$3 \leq x + y + z \leq 9$

6. Coating compositions as claimed in claim 1 or 2 characterized in that the equivalent ratio between amino groups and masked NCO-groups amounts to from about 0.7:1 to 1:1.

7. Coating compositions as claimed in claim 1 or 2 characterized in that component (c) is an aqueous polymer latex based on vinyl monomers and, optionally, diene monomers.

8. Coating compositions as claimed in claim 1 or 2 characterized in that component (c) is an aqueous solution of a homopolymer or copolymer or vinyl monomers.

9. Coating compositions as claimed in claim 1 or 2 characterized in that component (c) is an aqueous dispersion of a cationic, anionic or non-ionic polyurethane.

10. A process for coating substrates by applying a coating composition based on a polyurethane reactive system to the substrate by the direct or reverse coating process and hardening the coating thus applied with shaping or forming characterized in that the compositions claimed in claims 1 or 2 are used for coating and are hardened by heating the coated substrate to a temperature of from about 120° to 190° C.

* * * * *